US008699160B2

United States Patent
Annampedu et al.

(10) Patent No.: US 8,699,160 B2
(45) Date of Patent: Apr. 15, 2014

(54) METHODS AND APPARATUS FOR VALIDATING DETECTION OF RRO ADDRESS MARKS

(75) Inventors: Viswanath Annampedu, Schnecksville, PA (US); Xun Zhang, Westford, MA (US); Jeffrey P. Grundvig, Longmont, CO (US)

(73) Assignee: LSI Corporation, San Jose, CA (US)

( * ) Notice: Subject to any disclaimer, the term of this patent is extended or adjusted under 35 U.S.C. 154(b) by 344 days.

(21) Appl. No.: 13/281,923

(22) Filed: Oct. 26, 2011

(65) Prior Publication Data

US 2013/0107687 A1    May 2, 2013

(51) Int. Cl.
G11B 20/10    (2006.01)
G11B 5/596    (2006.01)

(52) U.S. Cl.
USPC .............................. 360/39; 360/77.04; 360/31

(58) Field of Classification Search
None
See application file for complete search history.

(56) References Cited

U.S. PATENT DOCUMENTS

| | | | |
|---|---|---|---|
| 5,923,491 A * | 7/1999 | Kisaka et al. | 360/77.04 |
| 6,141,175 A * | 10/2000 | Nazarian et al. | 360/77.04 |
| 7,082,005 B2 | 7/2006 | Annampedu et al. | |
| 7,286,313 B2 * | 10/2007 | Erden et al. | 360/39 |
| 8,154,822 B1 * | 4/2012 | Yu et al. | 360/77.04 |
| 2003/0030936 A1 * | 2/2003 | Smith et al. | 360/77.04 |
| 2003/0184908 A1 * | 10/2003 | Hsin | 360/77.04 |
| 2004/0136477 A1 * | 7/2004 | Annampedu et al. | 375/340 |
| 2004/0228019 A1 * | 11/2004 | Annampedu et al. | 360/39 |
| 2005/0068650 A1 * | 3/2005 | Annampedu et al. | 360/77.04 |
| 2005/0243455 A1 | 11/2005 | Annampedu | |
| 2006/0024033 A1 * | 2/2006 | Cho | 386/113 |
| 2006/0233286 A1 | 10/2006 | Annampedu et al. | |
| 2009/0052075 A1 | 2/2009 | Annampedu | |
| 2009/0268322 A1 | 10/2009 | Annampedu et al. | |
| 2010/0142078 A1 | 6/2010 | Annampedu et al. | |

* cited by examiner

Primary Examiner — Thang Tran
(74) Attorney, Agent, or Firm — Ryan, Mason & Lewis, LLP

(57) ABSTRACT

Methods and apparatus are provided for validating a detection of RRO address marks. After a potential RRO address mark is detected, a disclosed RROAM validation metric evaluates the energy of the remaining RRO data bits in the servo sector, relative to a predefined energy threshold. In addition, the number of remaining RRO data bits in the servo sector is compared to an expected value. The detected RRO address mark is validated in an exemplary embodiment if the RROAM validation metric satisfies the predefined energy threshold and the proper number of remaining RRO data bits is detected in the servo sector. The potential RRO address mark can optionally be discarded if the potential RRO address mark is not validated.

20 Claims, 4 Drawing Sheets

METHODS AND APPARATUS FOR VALIDATING DETECTION OF RRO ADDRESS MARKS

BACKGROUND

A read channel integrated circuit (IC) is one of the core electronic components in a modern hard disk drive. In a magnetic recording system, for example, a read channel converts and encodes data to enable magnetic recording heads to write data to a magnetic medium and to then read back the data accurately. The magnetic media in a magnetic recording system have a number of tracks and each track comprises "read" sectors, with "servo" sectors embedded between the read sectors. The information recorded in the servo sectors helps to position a magnetic recording head so that the user information stored in the read sectors can be retrieved properly.

The servo and read sectors both typically begin with the same known preamble pattern. The read preamble is followed by a read address mark and encoded user data. The servo preamble is followed by a servo address mark and various servo data, including a repeatable run out (RRO) data field that compensates for known errors due to inaccurate spindle centers on the disks. The RRO data field typically comprises an RRO synchronization pattern that is often referred to as an RRO address mark (RROAM), followed by additional RRO data.

If the RRO data field is not utilized in the servo sector, an AC erase pattern is typically written in its place. The AC erase pattern comprises a Nyquist pattern of alternating binary ones and binary zeroes. If there is an error in the detected AC erase pattern due to noise, causing one or more bits in the detected AC erase pattern to change value, the AC erase pattern may be improperly detected as an RRO address mark. A need therefore exists for techniques for validating the detection of RRO address marks.

SUMMARY

Illustrative embodiments of the invention validate a detection of RRO address marks. According to one aspect of the invention, after a potential RRO address mark is detected, a disclosed RROAM validation metric evaluates the energy of the remaining RRO data bits in the RRO data field that follow the RRO address mark, relative to a predefined energy threshold. In addition, the number of remaining RRO data bits in the servo sector is compared to an expected value. The detected RRO address mark is validated in an exemplary embodiment if the RROAM validation metric satisfies the predefined energy threshold and the proper number of remaining RRO data bits is detected in the servo sector. The potential RRO address mark can optionally be discarded if the potential RRO address mark is not validated.

In one exemplary embodiment, the disclosed RROAM validation metric is obtained as follows:

$$\sum_{i=0,4,8,...} |y[i] + y[i-1] - y[i-2] - y[i-3]|.$$

where y[i] comprises a substantial peak sample for a substantial best phase and y[i−1], y[i−2] and y[i−3] comprise three previous samples associated with y[i]. The substantial best phase may be determined, for example, by a best phase selector.

A more complete understanding of the present invention, as well as further features and advantages of the present invention, will be obtained by reference to the following detailed description and drawings.

DETAILED DESCRIPTION

Embodiments of the invention will be illustrated herein in conjunction with exemplary magnetic recording devices, controllers and associated read channel techniques. It should be understood, however, that the this and other embodiments of the invention are more generally applicable to any magnetic recording system in which improved RRO address mark detection is desired, and may be implemented using components other than those specifically shown and described in conjunction with embodiments of the invention.

Embodiments of the invention provide techniques for validating the detection of RRO address marks. According to one aspect of the invention, discussed further below in conjunction with FIG. 6, after a potential RRO address mark is detected, a disclosed RROAM validation metric evaluates the energy of the remaining RRO data bits in the servo sector, relative to a predefined threshold. In addition, the number of RRO data bits in the servo sector is compared to an expected value. In the exemplary embodiment, the detected RRO address mark is qualified if the RROAM validation metric satisfies the predefined energy threshold and the proper number of RRO data bits are detected in the servo sector.

Figure 1:
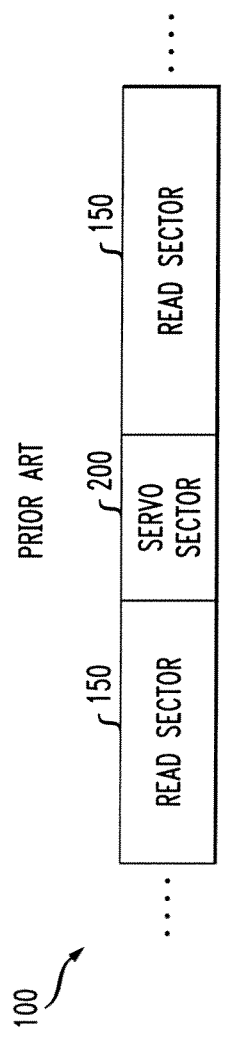
FIG. 1 illustrates a typical conventional track format for recording servo sector information and read sector information on a magnetic medium.

FIG. 1 illustrates a typical conventional track format 100 for recording servo sector information 200, as discussed further below in conjunction with FIG. 2, and read sector information 150 in a disk drive. In an embedded servo system, for example, there are typically approximately around 60 to 100 servo sectors 200 per track that consume about 10% of the surface area. The remaining 90% of the surface area is used for read sectors 150 to store user data information. As shown in FIG. 1, the servo sectors 200 and read sectors 150 typically alternate on a given track, such that each servo sector 200 is typically preceded by a read sector 150 and followed by a read sector 150.

Figure 2:
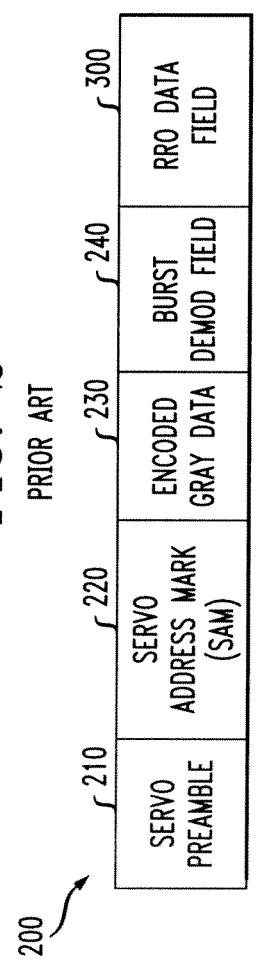
FIG. 2 illustrates an exemplary format for the servo sectors of FIG. 1.

FIG. 2 illustrates an exemplary format of servo sector information 200. As shown in FIG. 2, the exemplary servo sector information 200 comprises a preamble 210, such as a 2T preamble pattern, that allows the recording system to recover the timing and gain of the written servo data. The preamble 210 is typically followed by a servo address mark (SAM) 220 that is generally the same for all servo sectors and may then be followed by encoded Gray data 230. The Gray data 230 is followed by one or more burst demodulation fields

240. The burst demodulation fields 240 are followed by an RRO data field 300, as discussed further below in conjunction with FIG. 3. The SAM 220 comprises some fixed number of bits. The Gray data 230 represents the track number/cylinder information and serves as a coarse positioning for the magnetic recording head. The burst demodulation field(s) 240 serves as a fine positioning system for the head to be on track. The RRO data field 300 provides head positioning information that is finer than that provided by the Gray data 230 and more coarse than that provided by the burst demodulation field(s) 240.

Figure 3:
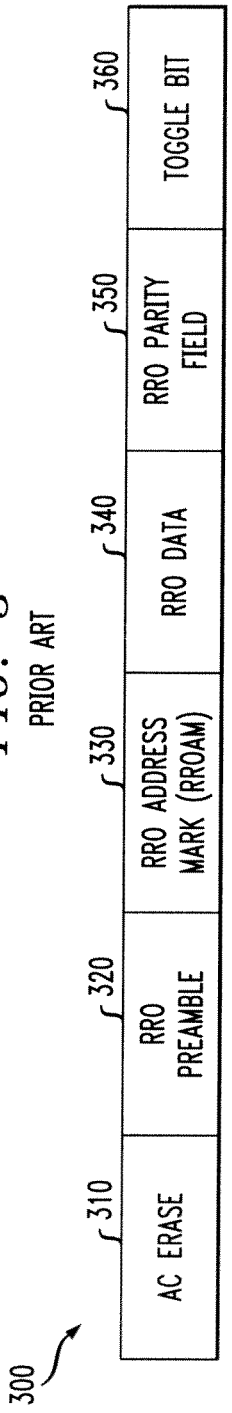
FIG. 3 illustrates an exemplary format for the RRO data field of FIG. 2.

FIG. 3 illustrates an exemplary format of the RRO data field 300. As shown in FIG. 3. The RRO data field 300 begins with an AC erase 310, which is typically a Nyquist pattern. The AC erase 310 is followed by an RRO Preamble 320 and the RRO address mark (RROAM) 330. The RROAM 330 is a bit pattern that is generally the same for all servo sectors. The RROAM 330 indicates when to start decoding RRO data and aids selection of the best sampling phase for decoding RRO data 340. RROAM 330 is followed RRO data 340, which includes head-positioning information. RRO data 340 is followed by an RRO parity field 350, which includes parity bits employed for error detection/correction. RRO parity field 350 is followed by a toggle bit 360, which brings the magnetization level to whatever the disk used in AC erase 310, in a known manner.

As previously indicated, the RROAM 330 can be any programmable pattern, such as a pattern of 01. The RROAM 330 is typically encoded using wide bi-phase encoding. Thus, a binary zero is encoded as "1100" and a binary one is encoded as "0011." If the RRO data field is not present in the servo sector, an AC erase pattern is typically written instead. If there is an error in the detected AC erase pattern due to noise, the AC erase pattern may be improperly detected as an RRO address mark. Thus, the present invention provides techniques for validating the detection of RRO address marks.

Figure 4:
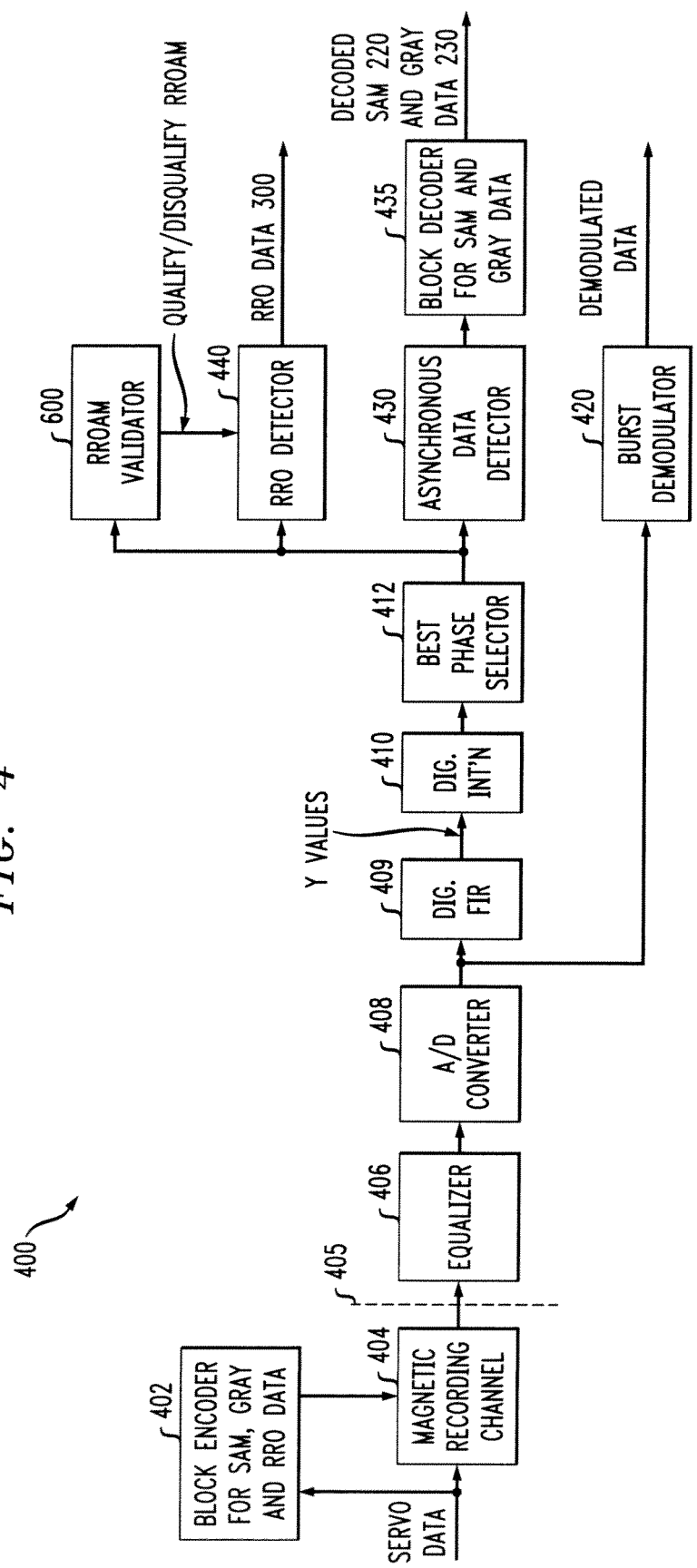
FIG. 4 is a block diagram illustrating a magnetic recording system according to one embodiment of the present invention.

FIG. 4 is a block diagram illustrating a magnetic recording system 400 according to one embodiment of the present invention. It is to be understood that the system 400 depicted in FIG. 4 is intended to illustrate the principles of the invention described herein. Portions of the magnetic recording system 400 may be implemented, for example, based on the teachings of U.S. Pat. No. 7,082,005, incorporated by reference herein.

As shown in FIG. 4, the exemplary magnetic recording system 400 comprises a servo data block encoder 402, a magnetic recording channel 404, an equalizer 406, for example, with a continuous time filter (CTF) (not shown), an analog-to-digital (A/D) converter 408, a digital FIR filter 409, digital interpolators 410, a best phase selector 412, a burst demodulator 420, an asynchronous data detector 430, a servo data block decoder 435, and an RRO detector 440. It is assumed that the exemplary servo data has the same format as shown and described in conjunction with FIGS. 2 and 3.

During a write operation, servo data 200 (FIG. 2) is encoded by the block encoder 402 and written to a magnetic medium such as a disk (denoted as 405) via the magnetic recording channel 404, in a known manner. Encoding by the block encoder 402 may be in accordance with any suitable encoding technique. Portions of the servo data 200 that are not encoded may also be written to the medium 405. Again, it is understood that a magnetic write head, while not expressly shown, is functionally interposed between the magnetic recording channel 404 and the magnetic medium 405 for writing data to the medium.

During a read operation, the servo data 200 (FIG. 2) is read from the magnetic medium 405 via a magnetic read head (not expressly shown but understood to be functionally interposed between the medium 405 and the equalizer 406) and then equalized by the equalizer 406. More specifically, a servo waveform corresponding to an encoded servo pattern is read back from the magnetic medium 405 and equalized, for example, by the CTF within the equalizer 406, in a known manner.

The waveform is then digitized by the A/D converter 408, as is also known. The input to the A/D converter 408 is typically a T symbol rate sampled target response equalized analog signal. It is to be understood that the techniques of the invention may be employed regardless of whether these T rate samples are asynchronously sampled or synchronously sampled with a conventional timing loop. As shown in FIG. 4, the digital values from the A/D converter 408 are processed by the burst demodulator 420 to fine position the magnetic read head over a given track of the magnetic medium 405, in a known manner.

The digital values at the output of the A/D converter 408 are also processed by a digital FIR filter 409 to generate symbol rate equalized A/D converter samples, referred to as 'Y' values, in a known manner. The 'Y' values are then interpolated using the digital interpolators 410 to generate interpolated values. The interpolated 'Y' values output by the digital interpolators 410 are then processed by a best phase selector 412. The best phase selector 412 selects a best phase of the combined stream of asynchronous sample values and interpolated 'Y' values. The best phase selector 412 may be implemented, for example, based on the teachings of United States Published Patent Application No. 2006/0233286, incorporated by reference herein. Generally, the best phase selector 412 employs a peak detection process to adjust a current best phase for sample selection.

The output of the best phase selector 412 is applied in parallel to an asynchronous data detector 430, an RRO detector 440 and a RROAM validator 600, as discussed further below in conjunction with FIG. 6. The asynchronous data detector 430 detects the servo data and the block decoder 435 then decodes the detected data in accordance with the encoding technique implemented by the block encoder 402.

The RRO detector 440 processes the interpolated 'Y' values from the best phase selector 412 which represent asynchronous sample values having an arbitrary phase for the RRO data field 300. The RRO detector 440 detects the RRO data field 300, in a known manner. The RRO detector 440 receives an RROAM qualification signal from the RROAM Validator 600 in accordance with the present invention, as discussed further below in conjunction with FIG. 6. Thus, an exemplary embodiment of the present invention operates in parallel to the conventional RRO detector 440. In addition, the present invention does not require additional information to be written on the magnetic medium, relative to conventional techniques.

Figure 5:
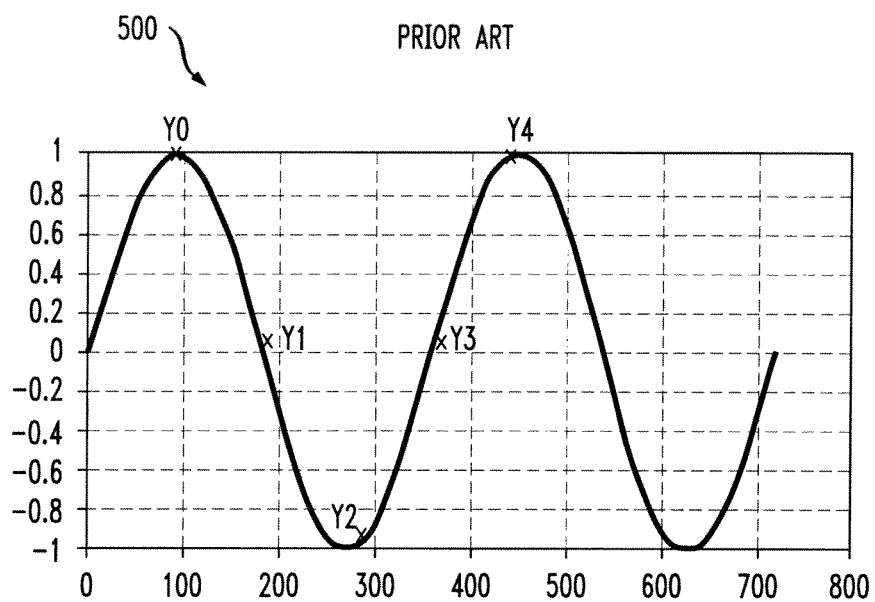
FIG. 5 illustrates a waveform comprising asynchronous sample points and interpolated sample points.
Figure 6:
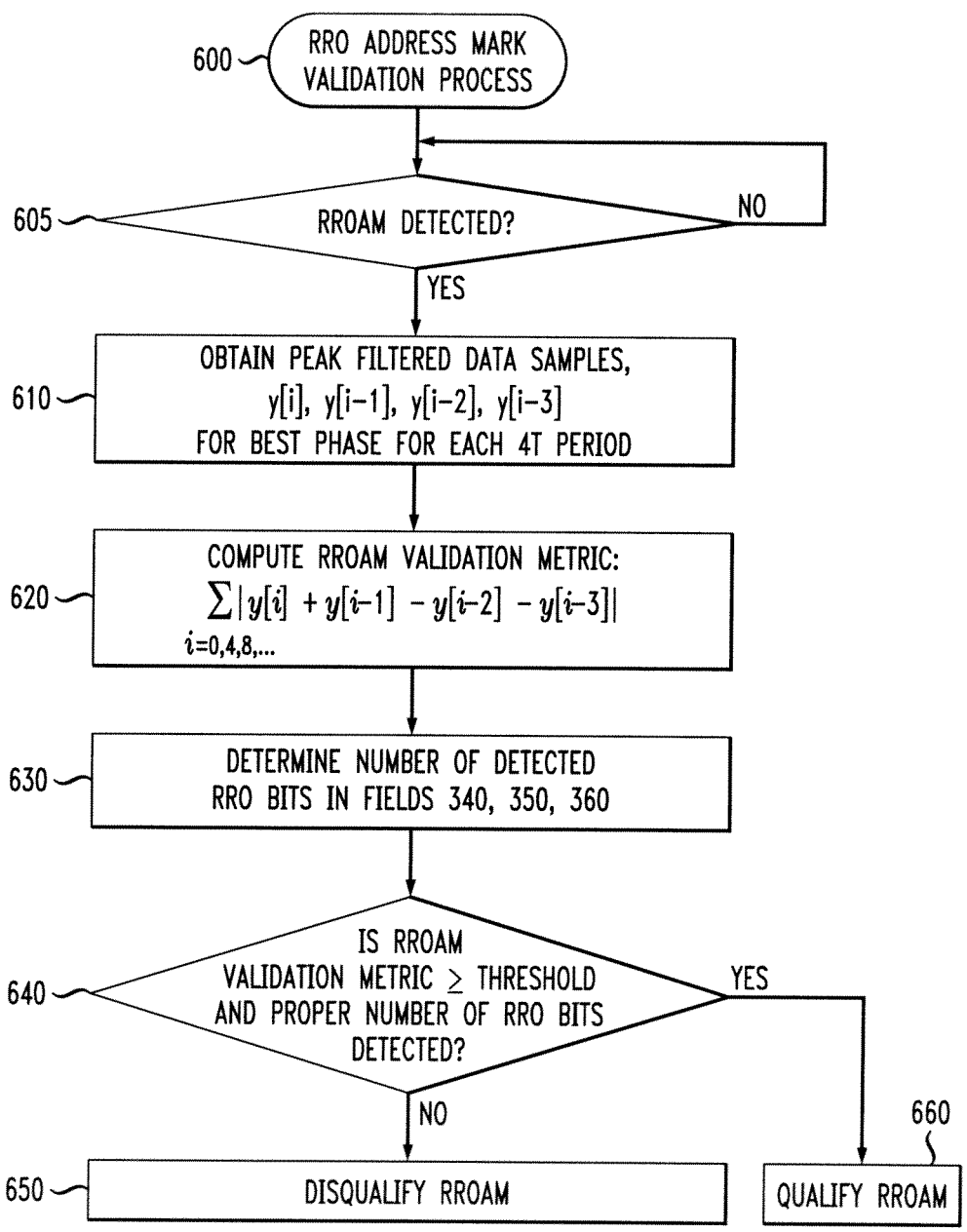
FIG. 6 is a flow chart describing an exemplary implementation of an RRO address mark validation process incorporating aspects of the present invention.

FIG. 5 illustrates a waveform including an exemplary peak sample point Y4 and three previous corresponding samples, Y3, Y2 and Y1 that are processed by the RRO address mark validation process 600 of FIG. 6 in accordance with the present invention. As indicated above, the best phase selector 412 selects a best phase of the combined stream of asynchronous sample values and interpolated 'Y' values. The absolute value of the sampled amplitude at the best phase is referred to as a peak sample, such as peak samples Y0 and Y4.

FIG. 6 is a flow chart describing an exemplary implementation of an RRO address mark validation process 600 incorporating aspects of the present invention. Generally, after an RRO address mark 330 is detected, information from the subsequent RRO data in fields 340, 350 and 360 can be used to validate the detected RRO address mark 330, by applying a threshold to a RROAM validation metric that evaluates the energy of the filtered potential RRO data samples.

A test is performed during step 605, to determine if the RROAM 330 is detected by RRO detector 440. Once it is determined during step 605 that the RROAM 330 is detected, then the sample corresponding to the best phase, y[i], and the corresponding three samples y[i−1], y[i−2], y[i−3], are obtained during step 610 for each 4T Period following the detected RROAM.

The exemplary RROAM validation metric is then computed during step 620, as follows:

$$\sum_{i=0,4,8,\dots} |y[i] + y[i-1] - y[i-2] - y[i-3]|.$$

where y[i] is a peak sample associated with the best phase identified by the best phase selector 412, aligned to wide bi-phase code word boundaries in the exemplary embodiment, and y[i−1], y[i−2] and y[i−3] are the three previous samples associated with y[i]. Generally, the RROAM validation metric accumulates the energy of the RRO data in fields 340, 350 and 360 (e.g., the energy of the bits following the detected potential RROAM 330 within the servo sector, for example, until the firmware sets an end-of-servo gate, in a known manner).

Thereafter, the number of detected RRO bits in fields 340, 350 and 360 is determined during step 630. The number of detected RRO bits in fields 340, 350 and 360 must match the specification for the RRO data field 300.

A test is performed during step 640, to determine if the RROAM validation metric is greater than or equal to a programmable threshold, T, (discussed below) and the proper number of RRO Bits was detected in fields 340, 350 and 360. If it is determined during step 640 that the RROAM validation metric is not greater than or equal to the threshold, T, or the proper number of bits was not detected, then the detected RROAM 330 is disqualified during step 650.

If, however, it is determined during step 640 that the RROAM validation metric is greater than or equal to the threshold, T, and the proper number of bits was detected, then the detected RROAM 330 is qualified during step 660.

As indicated above, the RROAM validation metric is compared to a programmable threshold. T, during step 640. The programmable threshold, T, can be set from histograms of the RROAM validation metric by choosing an approximate midpoint of mean (metric on AC ERASE) and mean (metric on RRO signal) as the threshold. Alternatively, the programmable threshold, T, can be set based on the expected energy of the bits in fields 340, 350 and 360 for valid RRO data versus AC erase patterns in these fields. The expected energy for RRO data can be approximated as twice the peak amplitude (since two peaks in 4T) times the number of RRO bits in fields 340, 350 and 360 (before wide bi-phase encoding). The threshold can be set, for example, to half of the expected energy, to provide a midpoint between the energy of RRO data and the energy of AC erase data.

As previously indicated, the arrangements of magnetic recording systems and read channels, as described herein, provide a number of advantages relative to conventional arrangements. Again, it should be emphasized that the above-described embodiments of the invention are intended to be illustrative only. In general, the exemplary magnetic recording systems can be modified, as would be apparent to a person of ordinary skill in the art, to incorporate RRO address mark validation schemes that validate detected RRO address marks. In addition, the disclosed RRO address mark validation techniques can be employed in any magnetic recording system. An exemplary RROAM validation metric has been presented for evaluating the energy of the exemplary RRO data format in fields 340, 350 and 360 (e.g., the energy of the bits following the detected potential RROAM 330 within the servo sector). Alternative RROAM validation metrics can be established for evaluating the energy of alternative formats for the RRO data field 300, as would be readily apparent to a person of ordinary skill in the art based on the disclosure herein.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method for validating an repeatable run out (RRO) address mark, comprising:
    detecting a potential RRO address mark;
    evaluating an energy of additional RRO bits following said potential RRO address mark in a servo sector;
    comparing said energy to a predefined threshold; and
    validating the potential RRO address mark if said energy satisfies the predefined threshold.

2. The method of claim 1, further comprising the step of comparing a number of said additional RRO bits following said potential RRO address mark in the servo sector to an expected value.

3. The method of claim 2, wherein said validating step further comprises the step of validating the potential RRO address mark if said energy satisfies the predefined threshold and an expected number of said additional RRO bits is detected following said potential RRO address mark in the servo sector.

4. The method of claim 1, wherein said additional RRO bits following said potential RRO address mark comprise RRO data bits, RRO parity bits and one or more toggle bits in said servo sector.

5. The method of claim 1, wherein said energy is obtained as follows:

$$\sum_{i=0,4,8,\ldots} |y[i] + y[i-1] - y[i-2] - y[i-3]|.$$

where y[i] comprises a substantial peak sample for a substantial best phase and y[i−1], y[i−2] and y[i−3] comprise three previous samples associated with y[i].

6. The method of claim 5, wherein said substantial best phase is determined by a best phase selector.

7. The method of claim 1, further comprising the step of discarding said potential RRO address mark if said energy does not satisfy the predefined threshold.

8. An apparatus for validating an repeatable run out (RRO) address mark, comprising:
a memory; and
at least one hardware device, coupled to the memory, operative to:
detect a potential RRO address mark;
evaluate an energy of additional RRO bits following said potential RRO address mark in a servo sector;
compare said energy to a predefined threshold; and
validate the potential RRO address mark if said energy satisfies the predefined threshold.

9. The apparatus of claim 8, wherein said at least one hardware device is further configured to compare a number of said additional RRO bits following said potential RRO address mark in the servo sector to an expected value.

10. The apparatus of claim 9, wherein said potential RRO address mark is validated if said energy satisfies the predefined threshold and an expected number of said additional RRO bits is detected following said potential RRO address mark in the servo sector.

11. The apparatus of claim 8, wherein said additional RRO bits following said potential RRO address mark comprise RRO data bits, RRO parity bits and one or more toggle bits in said servo sector.

12. The apparatus of claim 8, wherein said energy is obtained as follows:

$$\sum_{i=0,4,8,\ldots} |y[i] + y[i-1] - y[i-2] - y[i-3]|.$$

where y[i] comprises a substantial peak sample for a substantial best phase and y[i−1], y[i−2] and y[i−3] comprise three previous samples associated with y[i].

13. The apparatus of claim 12, wherein said substantial best phase is determined by a best phase selector.

14. The apparatus of claim 8, wherein said at least one hardware device is further configured to discard said potential RRO address mark if said energy does not satisfy the predefined threshold.

15. The apparatus of claim 8, wherein said apparatus is embodied on an integrated circuit.

16. An repeatable run out (RRO) address mark validator, comprising:
means for evaluating an energy of additional RRO bits following a potential RRO address mark detected in a servo sector;
means for comparing said energy to a predefined threshold; and
means for validating the potential RRO address mark if said energy satisfies the predefined threshold.

17. The RRO address mark validator of claim 16, further comprising means for comparing a number of said additional RRO bits following said potential RRO address mark in the servo sector to an expected value.

18. The RRO address mark validator of claim 17, means for validating the potential RRO address mark validates said potential RRO address mark if said energy satisfies the predefined threshold and an expected number of said additional RRO bits is detected following said potential RRO address mark in the servo sector.

19. The RRO address mark validator of claim 16, wherein said additional RRO bits following said potential RRO address mark comprise RRO data bits, RRO parity bits and one or more toggle bits in said servo sector.

20. The RRO address mark validator of claim 16, wherein said RRO address mark validator is embodied on an integrated circuit.

* * * * *